(12) United States Patent
Kim et al.

(10) Patent No.: US 8,787,041 B2
(45) Date of Patent: Jul. 22, 2014

(54) POWER CONVERTER INTEGRATED WITH FLYBACK CONVERTER

(75) Inventors: Chong Eun Kim, Daejeon (KR); Don Sik Kim, Gyunggi-do (KR); Jae Kuk Kim, Incheon (KR); Gun Woo Moon, Daejeon (KR); Shin Young Cho, Seoul (KR)

(73) Assignees: Samsung Electro-Mechanics Co., Ltd., Gyunggi-Do (KR); Korea Advanced Institute of Science and Technology, Daejeon (KR)

( * ) Notice: Subject to any disclaimer, the term of this patent is extended or adjusted under 35 U.S.C. 154(b) by 209 days.

(21) Appl. No.: 13/327,299

(22) Filed: Dec. 15, 2011

(65) Prior Publication Data

US 2012/0155119 A1 Jun. 21, 2012

(30) Foreign Application Priority Data

Dec. 16, 2010 (KR) .................. 10-2010-0129048

(51) Int. Cl.
*H02M 3/335* (2006.01)

(52) U.S. Cl.
USPC .................... 363/17; 363/21.12

(58) Field of Classification Search
USPC .......................... 363/17, 65, 21.12
See application file for complete search history.

(56) References Cited

U.S. PATENT DOCUMENTS

| | | | |
|---|---|---|---|
| 4,864,479 A * | 9/1989 | Steigerwald et al. | 363/17 |
| 6,016,258 A * | 1/2000 | Jain et al. | 363/17 |
| 6,442,052 B1 * | 8/2002 | Hemena et al. | 363/97 |
| 6,504,739 B2 | 1/2003 | Phadke | |
| 6,567,285 B2 * | 5/2003 | Cho et al. | 363/132 |
| 7,092,266 B2 * | 8/2006 | Frank | 363/65 |
| 7,532,493 B2 | 5/2009 | Lou et al. | |
| 7,923,974 B2 * | 4/2011 | Martin et al. | 323/212 |

FOREIGN PATENT DOCUMENTS

| | | |
|---|---|---|
| KR | 10-2008-0013242 A | 2/2008 |
| KR | 10-0887095 B1 | 2/2009 |
| KR | 20-2009-0003906 | 4/2009 |

OTHER PUBLICATIONS

Korean Office Action, and English translation thereof, issued in Korean Patent Application No. 10-2010-0129048 mailed Oct. 4, 2012.

* cited by examiner

*Primary Examiner* — Adolf Berhane
*Assistant Examiner* — Emily P Pham
(74) *Attorney, Agent, or Firm* — McDermott Will & Emery LLP

(57) ABSTRACT

There is provided a power converter integrated with an auxiliary converter. The power converter includes: a flyback converter converting an input power of a power supply input terminal into a standby power through a primary side circuit connected to the power supply input terminal and a secondary side circuit magnetically coupled to the primary side circuit to supply the standby power; and a main converter converting the input power of the power supply input terminal into a main power to supply the main power, and converting the input power of the power supply input terminal into the standby power through the secondary side circuit of the flyback converter to supply the standby power, whereby the efficiency of the power converter may be improved.

8 Claims, 5 Drawing Sheets

POWER CONVERTER INTEGRATED WITH FLYBACK CONVERTER

CROSS-REFERENCE TO RELATED APPLICATIONS

This application claims the priority of Korean Patent Application No. 10-2010-0129048 filed on Dec. 16, 2010, in the Korean Intellectual Property Office, the disclosure of which is incorporated herein by reference.

BACKGROUND OF THE INVENTION

1. Field of the Invention

The present invention relates to a power converter, and more particularly, to a power converter having improved efficiency.

2. Description of the Related Art

Generally, a power supply system of an electronic product includes a separate independent auxiliary converter in order to provide a standby power, in addition to a main converter for providing a main power. The power supply system of the electronic product, having the above structure supplies the main power to the electronic product through the main converter, and also continually supplies the standby power to the electronic product through the separate independent auxiliary converter, during the operation (hereinafter, referred to as a 'normal mode') of the electronic product. In addition, the power supply system supplies the standby power to the electronic product through the separate auxiliary converter during a standby mode (indicating a mode for maintaining a ready state before the electronic product is normally operated).

As the auxiliary converter for supplying the standby power, a flyback converter has mainly been used in recent years. While the flyback converter has been widely used due to the simple structure thereof, it may cause the efficiency of the entire power system to be lowered due to high voltage stress applied to switching devices and hard switching (indicating switching performed in a state in which the level of voltage between the switching devices or the level of current flowing in the switching devices is not zero).

SUMMARY OF THE INVENTION

An aspect of the present invention provides a power converter having improved efficiency.

According to an aspect of the present invention, there is provided a power converter including: a flyback converter converting an input power of a power supply input terminal into a standby power through a primary side circuit connected to the power supply input terminal and a secondary side circuit magnetically coupled to the primary side circuit to supply the standby power; and a main converter converting the input power of the power supply input terminal into a main power to supply the main power, and converting the input power of the power supply input terminal into the standby power through the secondary side circuit of the flyback converter to supply the standby power.

The main power and the standby power may be respectively supplied through the main converter during a normal mode, and the standby power may be supplied using the primary side circuit and the secondary side circuit of the flyback converter during a standby mode.

The main converter may include: a bridge circuit in which both terminals of a first switching device and a second switching device connected in series are connected in parallel with the power supply input terminal and both terminals of a third switching device and a fourth switching device connected in series are connected in parallel with the power supply input terminal; a transformer having a primary side winding connected between a first node, which is a connection point between the first switching device and the second switching device, and a second node, which is a connection point between the third switching device and the fourth switching device and at least one secondary side winding magnetically coupled to the primary side winding; and an LC filter connected to the secondary side winding of the transformer.

The power converter may further include a switching module for turning a current flowing in the secondary side winding of the transformer on/off.

The secondary circuit of the flyback converter may be installed between both terminals of the secondary side winding of the transformer and both terminals of the LC filter.

The power converter may further include an auxiliary switching device for turning a current flowing in the secondary side circuit of the flyback converter on/off.

Each of the first to fourth switching devices may include a parasitic capacitor and a body diode connected in parallel with each other, and each of the first to fourth switching device may be turned on after a voltage charged in the parasitic capacitance included in each of the switching devices is completely discharged.

The auxiliary switching device may be turned on at the time when the first switching device or the second switching device is turned on.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
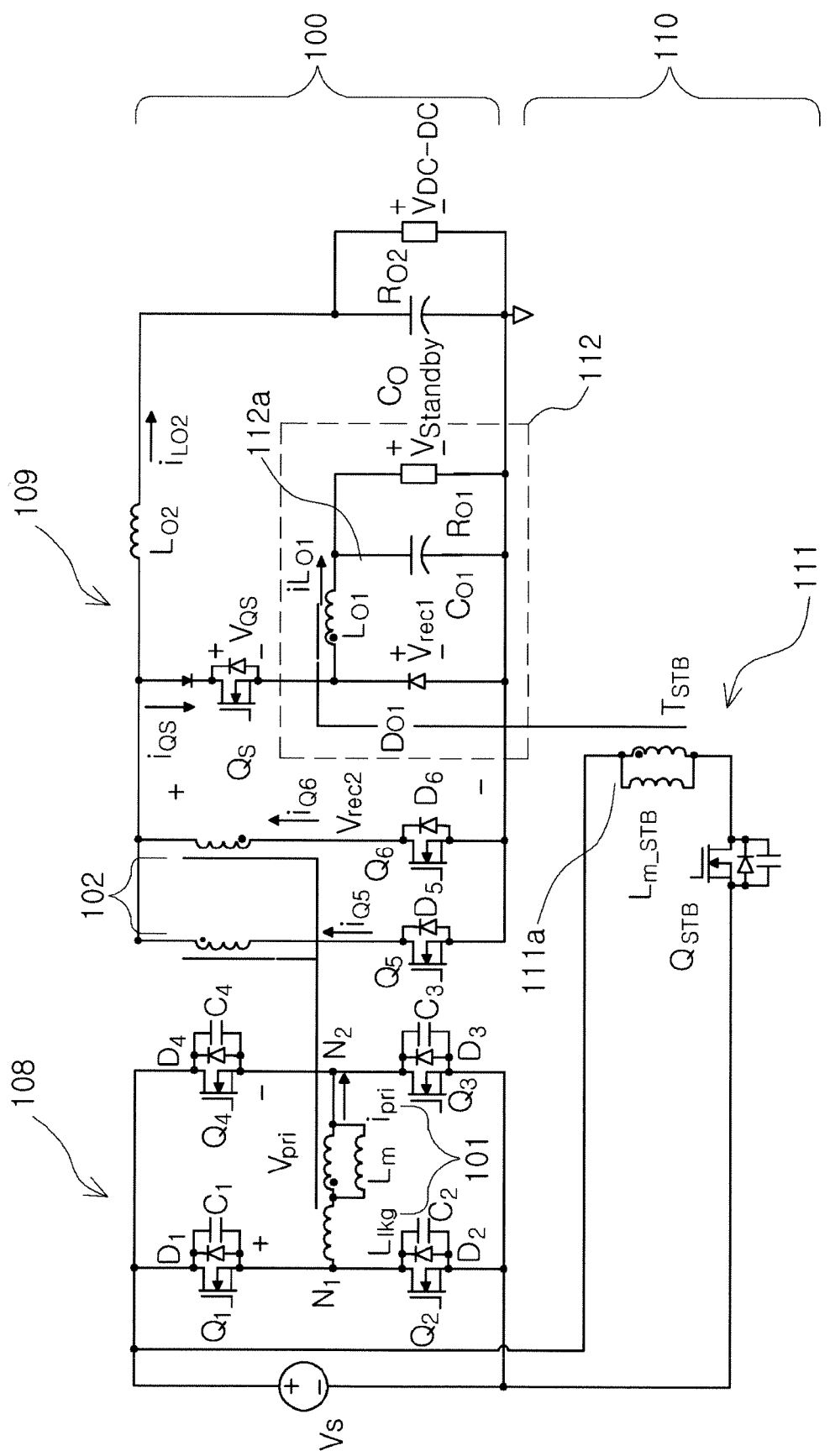
FIG. 1 is a circuit diagram of a power converter integrated with an auxiliary converter according to an exemplary embodiment of the present invention.

Hereinafter, exemplary embodiments of the present invention will be described in detail with reference to the accompanying drawings, which will fully convey the concept of the invention to those skilled in the art. Moreover, detailed descriptions related to well-known functions or configurations will be ruled out in order not to unnecessarily obscure the subject matter of the present invention.

It is also noted that like reference numerals denote like elements in appreciating the drawings.

Figure 2:
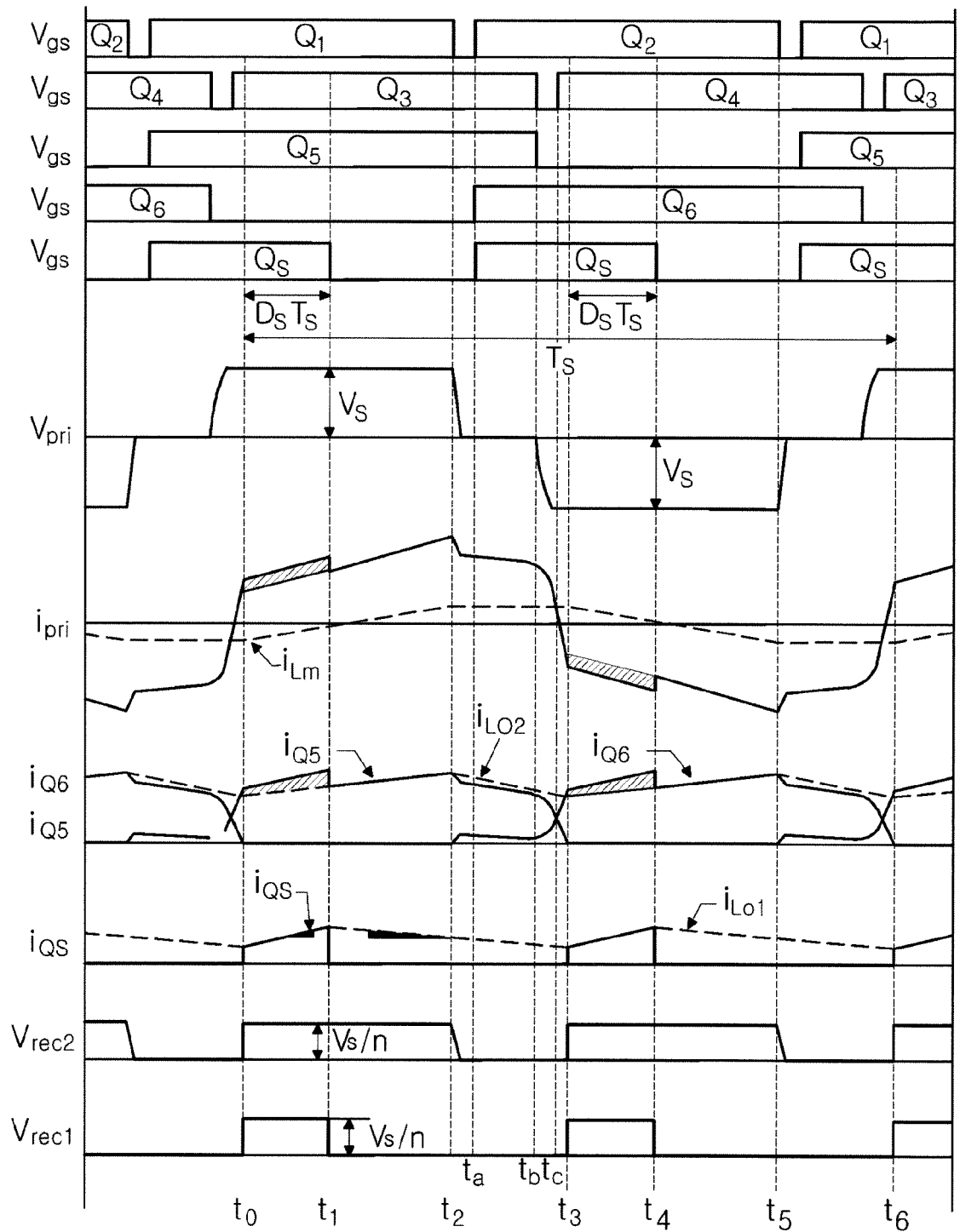
FIG. 2 is a waveform diagram showing waveforms of main components of a power converter according to an exemplary embodiment of the present invention.

FIG. 1 is a circuit diagram of a power converter according to an exemplary embodiment of the present invention. FIG. 2 is a waveform diagram showing waveforms of main components of a power converter according to an exemplary embodiment of the present invention. A power converter according to an exemplary embodiment of the present invention is configured to include a main converter 100 for supplying a main power to a load and a flyback converter for supplying a standby power Vstanby to the load, which is an auxiliary converter 110.

A primary side circuit 111 of the auxiliary converter 110 is disposed outside the main converter 100, and a secondary side circuit 112 of the auxiliary converter 110 is integrated in the main converter 100. The power converter having the above structure supplies the main power $V_{DC-DC}$ and the standby power Vstanby to the load through the main converter 100 including the secondary side circuit 112 of the auxiliary converter 110 during a normal mode, and supplies the standby power to the electronic product through the separate independent auxiliary converter, and supplies the standby power Vstanby to the load using only the primary side circuit 11 and the secondary side circuit 112 of the auxiliary converter 110 during a standby mode.

Hereinafter, a power converter according to an exemplary embodiment of the present invention will be described in detail with reference to FIG. 1.

Referring to FIG. 1, a phase shift DC/DC full-bridge converter (PSFC) having the secondary circuit 112 of the auxiliary converter 110 integrated in an output terminal thereof, which is an example of the main converter 100 according to an exemplary embodiment of the present invention, is shown. The phase shift DC/DC full-bridge converter has high efficiency due low current/voltage stress and zero voltage switching (ZVS), such that it is very advantageous for power applications.

More specifically, the main converter 100 includes a bridge circuit $Q_1$ to $Q_4$ in which both terminals of a first switching device $Q_1$ and a second switching device $Q_2$ connected in series are connected in parallel with a power supply input terminal and both terminals of a third switching device $Q_3$ and a fourth switching device $Q_4$ connected in series are connected in parallel with the power supply input terminal, a transformer 101 and 102 having a primary side winding 101 connected between a first node $N_1$, which is a connection point between the first switching device $Q_1$ and the second switching device $Q_2$, and a second node $N_2$, which is a connection point between the third switching device $Q_3$ and the fourth switching device $Q_4$ and at least one secondary side winding 102 magnetically coupled to the primary side winding 101, and an LC filter $L_{O2}$ and $C_{O2}$ connected to the secondary side winding 102 of the transformer 101 and 102.

In addition, the main converter 100 may include switching modules $Q_5$ and $Q_6$ for opening or closing the flow of currents $i_{Q5}$ and $i_{Q6}$ flowing in the secondary side winding 102 of the transformers 101 and 102. The secondary side circuit 112 of the auxiliary converter 110 is installed between both terminals of the secondary side winding 102 of the transformer 101 and 102 and both terminals of the LC filter $L_{O2}$ and $C_{O2}$, and the flow of current $i_{Qs}$ flowing in the secondary side circuit 112 of the auxiliary converter 110 is opened or closed by a switching device Qs.

Meanwhile, a turn ratio of the transformer 101 and 102 may be Np:Ns=n:1, and the primary side winding 101 may be represented by leakage inductance $L_{lkg}$ and magnetizing inductance components and Lm as shown in FIG. 1. Meanwhile, each of the first switching device $Q_1$ to the fourth switching device 44 may include diodes $D_1$ and $D_4$ and parasitic capacitance components $C_1$ to $C_4$.

The main converter 100 having the above structure supplies the main power to a load $R_{O2}$ and also supplies the standby power Vstanby to a load $R_{O1}$ through the secondary side circuit 112 of the auxiliary converter 110, during the normal mode.

Hereinafter, the first switching device $Q_1$ to the four switching device $Q_4$, and the primary side winding 101 of the transformer 101 and 102 in the main converter 100 will be referred to as a primary side circuit of the main converter 100, and the secondary side winding 102 of the transformer 101 and 102, a fifth switching device $Q_5$, a sixth switching device $Q_6$, the LC filter $L_{O2}$ and $C_{O2}$, the switching device Qs and the secondary side circuit 112 of the auxiliary converter 110 will be referred to as a secondary side circuit of the main converter 100.

Meanwhile, the auxiliary converter 110 is shown as, for example, the flyback converter having a secondary side in the form of a buck converter in FIG. 1. As shown in FIG. 1, the primary side circuit 111 of the auxiliary converter 110 is connected to the power supply input terminal, and has a primary side winding 111a and a standby switching device $Q_{STB}$ connected in series. An $L_{m\_STB}$ that is not described means a magnetizing inductance of the primary side winding 111a. Meanwhile, the secondary side circuit of the auxiliary converter 110 is the buck converter configured of a diode $D_{O1}$, a secondary side winding 112a, and a capacitor $C_{O1}$, and is integrated in the main converter 100.

More specifically, the secondary side circuit 112 of the auxiliary converter 110 is installed between both terminals of the secondary side winding 102 of a transformer 111a and 112a and both terminals of the LC filter $L_{O2}$ and $C_{O2}$, and the switching devices $Q_5$ and $Q_6$ may be connected in series with the secondary side winding 102.

Meanwhile, the flow of current flowing in the secondary side circuit 112 of the auxiliary converter 110 is opened and closed by the switching device Qs. In this auxiliary converter 110, when a pulse width modulation signal having a predetermined frequency and duty is applied to a gate terminal of the standby switching device $Q_{STB}$ connected to the primary side winding 111a during the standby mode, energy is transferred from the primary side winding 111a to the secondary side winding 112a of the transformer 111a and 112a by switching of the standby switching device $Q_{STB}$, and the energy transferred to the secondary side winding 112a passes through the diode $D_{o1}$ and the output capacitor $C_{o1}$ to be converted into direct current power according to a turn ratio (n:1) between the primary side and the secondary side of the transformer 111a and 112a, such that the output voltage Vstanby, which is the standby power, is outputted. However, the standby switching device $Q_{STB}$ is turned off during the normal mode, such that the primary side circuit 111 does not operate.

The above-mentioned power converter supplies the main power $V_{DC-DC}$ to the load $R_{o2}$ under a control of the first through sixth switching devices $Q_1$ to $Q_6$ of the main converter 100, and supplies the standby power Vstanby to the load $R_{o1}$ under a control of the auxiliary switching device $Q_s$ of the secondary side circuit 112 of the auxiliary converter 110, during the normal mode (In this case, the standby switching device $Q_{STB}$ is turned off). Here, the auxiliary switching device Qs is turned on at the time when the first switching device $Q_1$ or the second switching device $Q_2$ is turned on, such that the zero voltage switching of the auxiliary switching device Qs may be performed, whereby the efficiency of the power converter may be increased.

Meanwhile, the above-mentioned power converter supplies the standby power Vstanby to the load $R_{01}$ under a control of the standby switching device $Q_{STB}$, similar to an operation of an existing flyback converter, during the standby mode (in this case, the control is not performed by the first switching device $Q_1$ to the sixth switching device $Q_6$ and the auxiliary switching device Qs is turned off). The efficiency of the power converter may be improved through the above configuration.

Hereinafter, an operation principle of a power converter integrated with an auxiliary converter according to an exemplary embodiment of the present invention will be described in detail with reference to FIGS. 1 and 2.

In the case of the standby mode, the first switching device $Q_1$ to the sixth switching device $Q_6$ of the main converter 100 are turned off, and only the primary side circuit 111 and the secondary circuit 112 of the auxiliary converter are used. An operation of this case is the same as that of the existing flyback converter itself and a detailed description thereof will be thus omitted.

Hereinafter, a case in which the power converter operates in the normal mode will be described for each period of the normal mode with reference to FIGS. 1 and 2.

The normal mode may be divided into a first period t0~t1, a second period t1~t2, a third period t2~t3, a fourth period t3~t4, a fifth period t4~t5, and a sixth period t5~t6. The periods of the fourth period t3~t4 through the sixth period t5~t6 operate under the same principle as those of the periods of the first period t0~t1 through the third period t2~t3. Therefore, the periods of the first period t0~t1 through the third period t2~t3 will be mainly used for the simplification of description.

1. First Period to~t1—$Q_1/Q_3/Q_5/Q_s$:ON, $Q_2/Q_4/Q_6$:OFF

Since the first switching device $Q_1$ and the third switching device $Q_3$ are in a turned-on state, a voltage $V_{pri}$ at the primary side winding 101 of the main converter 100 is identical to a power supply voltage Vs. Therefore, a primary side current ipri flowing through a path from the first switching device $Q_1$ to the third switching device $Q_3$ through the primary side winding 101 of the transformer (the first switching device $Q_1$—the primary side winding 101 of the transformer—the third switching device $Q_3$) is increased at a predetermined gradient. Meanwhile, since the fifth switching device $Q_5$ is in a turned-on state, a voltage $V_{rec2}$ at a secondary side winding 102 becomes a voltage of Vs/n according to a turn ratio (n:1), such that a current $i_{Lo2}$ flowing in the inductor $L_{o2}$ is increased at a gradient of $(Vs/n-V_{DC-DC})/L_{O2}$. In addition, since Qs is in a turned-on state, a voltage $V_{rec1}$ across between the both terminals of the diode $D_{O1}$ becomes a voltage of Vs/n, such that a current $i_{LO1}$ flowing in the inductor $L_{o1}$ is increased at a gradient of $(Vs/n-V_{STANBY})/L_{O1}$.

Meanwhile, each of parasitic capacitors $C_2$ and $C_4$ of the second switching device $Q_2$ and the fourth switching device $Q_4$ is charged with the voltage of Vs. As described above, in the first period, the main power $V_{DC\_DC}$ is powered from a primary side circuit 108 of the main converter 100 to the secondary side circuit 109 thereof, and the standby power Vstanby is powered to the secondary side circuit 112 of the auxiliary converter 110. Symbols $i_{Q5}$ and $i_{Q6}$ that are not described, respectively, mean a current flowing in the fifth switching device $Q_5$ and a current flowing in the sixth switching device $Q_6$.

2. Second Period t1~t2—$Q_1/Q_3/Q_6$:ON, $Q_2/Q_4/Q_6$:OFF, Qs:TURN OFF

In this period, the auxiliary switching device Qs is turned off. The auxiliary switching device Qs is turned off, such that the main converter 100 is disconnected from the secondary side circuit 112 of the auxiliary converter 110. As a result, the level of the current $i_{QS}$ flowing in the auxiliary switching device Qs becomes 0, and the current $i_{Lo1}$ flowing in the inductor $L_{o1}$ of the secondary side circuit 112 of the auxiliary converter 110 is freewheeled through the diode $D_{o1}$. Therefore, the level of the voltage across between the both terminals of the diode $D_{o1}$ is 0V, and the gradient of the current $i_{Lo1}$ is $V_{STANBY}/L_{O1}$.

Meanwhile, since the first switching device $Q_1$ and the third switching device $Q_3$ are still in a turned-on state, the voltage $V_{pri}$ at the primary side winding 101 of the main converter 100 is still identical to the power supply voltage Vs, and the primary side current $i_{pri}$ flowing through the path from the first switching device $Q_1$ to the third switching device $Q_3$ through the primary side winding 101 of the transformer 101 (the first switching device $Q_1$—the primary side winding 101 of the transformer—the third switching device $Q_3$) is increased at a predetermined gradient. As described above, in the second period, only the main power $V_{DC\_DC}$ is powered from the primary side circuit 108 of the main converter 100 to the secondary side circuit 109 thereof. Meanwhile, each of the parasitic capacitors $C_2$ and $C_4$ of the second switching device $Q_2$ and the fourth switching device $Q_4$ is charged with the voltage of Vs.

3. Third Period (t2~t3)

The third period may be more specifically divided into four periods such as a (a) period t2~ta, a (b) period ta~tb, a (c) period tb~tc, and a (d) period tc~td. Hereinafter, each period will be described in detail.

(a) Period t2~ta—$Q_3/Q_5$:ON, $Q_2/Q_4/Q_6/Q_s$:OFF, $Q_1$:TURN OFF

In this period, the first switching device $Q_1$ is turned off. Since the first switching device $Q_1$ is turned off, the parasitic capacitor $C_1$ of the first switching device $Q_1$ is charged with the power supply voltage Vs by the primary side current $i_{pri}$ flowing through a path from the parasitic capacitor $C_1$ of the first switching device $Q_1$ to the third switching device $Q_3$ through the primary side winding 101 of the transformer (the parasitic capacitor $C_1$ of the first switching device $Q_1$—the primary side winding 101 of the transformer—the third switching device $Q_3$), and the level of the voltage $V_{pri}$ at the primary side winding 101 of the main converter 100 is reduced to 0. The primary side current $i_{pri}$ of the main converter 100 also has a slight reduction period.

Meanwhile, in the (a) period, the voltage Vs charged in the parasitic capacitor $C_2$ of the second switching device $Q_2$ is discharged through a path from the primary side winding 101 of the transformer 101 and 102 to the third switching device $Q_3$ to thereby become 0V. In addition, since the auxiliary switching device Qs is in a turned-off state, the level of the current $i_{QS}$ flowing in the auxiliary switching device Qs becomes 0, and the current $i_{Lo1}$ flowing in the inductor $L_{o1}$ of the secondary side circuit 112 of the auxiliary converter 110 is freewheeled through the diode $D_{o1}$. Here, the gradient of the current $i_{Lo1}$ is $V_{stanby}/L_{O1}$.

(b) Period (ta~tb)—$Q_3/Q_5$:ON, $Q_1/Q_4$:OFF, $Q_2/Q_6/Qs$: TURN ON

In this period, the second switching device $Q_2$, the sixth switching device $Q_6$, and the auxiliary switching device Qs are turned on. After the voltage charged in the parasitic capacitor $C_2$ of the second switching device $Q_2$ in the (a) period is completely discharged, the second switching device $Q_2$ is turned on, such that the zero voltage switching may be performed for the second switching device $Q_2$. The voltage $V_{pri}$ at the primary side winding 101 of the main converter 100 is 0V, such that the primary side current $i_{pri}$ flows through a path from the second switching device $Q_2$ to the third switching device $Q_3$ through the primary side winding 101 of the transformer (the second switching device $Q_2$—the primary side winding 101 of the transformer—the third switching device $Q_3$). However, as shown in FIG. 2, the primary side current $i_{pri}$ may be slightly reduced by a leakage resistance (not shown). Meanwhile, since the voltage $V_{pri}$ at the primary side winding 101 of the main converter 100 is 0V, the voltage $V_{rec2}$ at the secondary side winding 102 is also 0V.

Accordingly, the zero voltage switching of the auxiliary switching device Qs may be performed, and the current $i_{Lo2}$ flowing in the inductor $L_{O2}$ of the main converter 100 flows through the load $R_{o2}$, the fifth switching device $Q_5$, and the sixth switching device $Q_6$. Meanwhile, since the auxiliary switching device Qs is in a turned-on state, the voltage $V_{rec1}$ across between the terminals of the diode $D_{O1}$ is also 0V, such that the current $i_{Lo1}$ flowing in the inductor $L_{o1}$ of the secondary side circuit 112 of the auxiliary converter 110 is freewheeled through the diode $D_{o1}$. Here, the gradient of the current $i_{Lo1}$ is $V_{stanby}/L_{O1}$.

(c) Period (tb~tc)—$Q_2/Q_6$/Qs:ON, $Q_1Q_4$:OFF, $Q_3/Q_5$: TURN OFF

In this period, the third switching device $Q_3$ and the fifth switching device $Q_5$ are turned off. Since the third switching device $Q_3$ is turned off, the voltage charged in the fourth switching device $Q_4$ is completely discharged through a path from the power supply Vs to the primary side winding 101 of the transformer through the second switching device $Q_2$ (the power supply Vs—the second switching device $Q_2$—the primary side winding 101 of the transformer), and the voltage $V_{pri}$ at the primary side winding 101 of the main converter 100 decreases from 0v to −Vs. Meanwhile, as the voltage at the primary side winding 101 of the transformer decreases from 0V to −Vs, the primary side current $i_{pri}$ flowing in the primary side winding 101 of the transformer is also gradually reduced. In addition, since the fifth switching device $Q_5$ is turned off, the current that has flowed through a channel of the fifth switching device $Q_5$ flows through the diode $D_5$.

The sum of the current $i_{Q5}$ flowing through the diode $D_5$ of the fifth switching device $Q_5$ and the current $i_{Q6}$ flowing through a body of the sixth switching device $Q_6$ is identical to the current $i_{Lo2}$ flowing in the inductor $L_{o2}$ of the main conductor 100, and the current $i_{QS}$ flowing in the auxiliary switching device Qs is 0, as shown in FIG. 2. Meanwhile, as shown in FIG. 2, the voltage $V_{rec1}$ of the diode $D_{O1}$ of the auxiliary converter 100 and the voltage $V_{rec2}$ at the secondary winding 102 of the main converter 100 are 0V.

(d) Period (tc~td)—$Q_2/Q_6$/Qs:ON, $Q_1/Q_3/Q_6$:OFF, $Q_4$:TURN ON

In this period, the fourth switching device $Q_4$ is turned on. After the voltage charged in the parasitic capacitor $C_4$ of the fourth switching device $Q_4$ in the (c) period is completely discharged, the fourth switching device $Q_4$ is turned on, such that the zero voltage switching may be performed for the fourth switching device $Q_4$. Since the second switching device $Q_2$ and the fourth switching device $Q_4$ are in a turned-on state, the voltage $V_{pri}$ at the primary side winding 101 of the main converter 100 is identical to −Vs, such that the primary side current $i_{pri}$ flowing through a path from the fourth switching device $Q_4$ to the second switching device $Q_2$ through the primary side winding 101 of the transformer 101 (the fourth switching device $Q_4$—the primary side winding 101 of the transformer 101—to the second switching device $Q_2$) is decreased at a predetermined gradient.

Meanwhile, the sum of the current $i_{Q5}$ flowing through the diode $D_5$ of the fifth switching device $Q_5$ and the current $i_{Q6}$ through the body of the sixth switching device $Q_6$ is identical to the current $i_{Lo2}$ flowing in the inductor $L_{o2}$ of the main conductor 100 and the current $i_{QS}$ flowing in the auxiliary switching device Qs is 0, as shown in FIG. 2. When the level of the current $i_{Q6}$ flowing in the sixth switching device $Q_6$ becomes equal to that of the current $i_{Lo2}$ flowing in the inductor $L_{o2}$ of the main converter 100, the current $i_{QS}$ flows through the auxiliary switching device Qs. Meanwhile, as shown in FIG. 2, the voltage $V_{rec1}$ of the diode $D_{O1}$ of the auxiliary converter 100 and the voltage $V_{rec2}$ at the secondary winding 102 of the main converter 100 are 0V.

Meanwhile, a symbol Ts in FIG. 2 means one switching period. A DC conversion ratio of the standby power Vstanby, which is an output voltage of the secondary side circuit 112 of the auxiliary converter 110 in the normal mode, may be expressed as the following equation 1.

$$\frac{Vstanby}{V_s} = \frac{2D_s}{n}$$ [Equation 1]

Here, Ds means a duty ratio of the auxiliary switching device Qs, and n means a turn ratio of the primary side winding 111a and the secondary side winding 112a of the auxiliary converter 110.

Figure 3A:
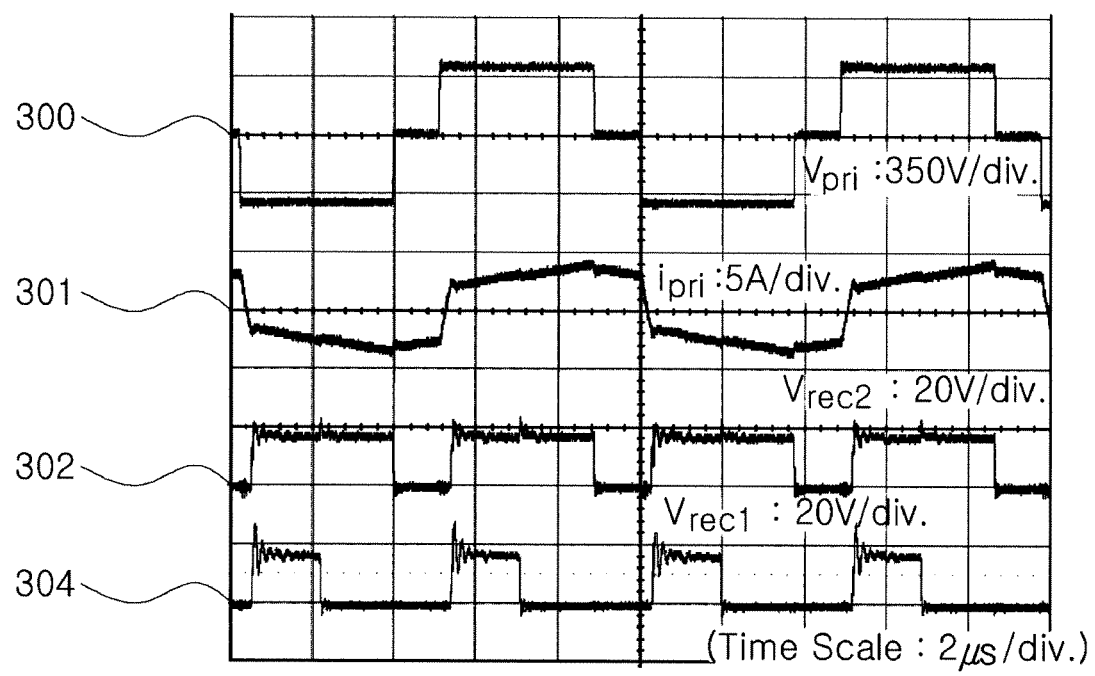
FIGS. 3A and 3B are waveform diagrams showing experimental waveforms of a power converter according to an exemplary embodiment of the present invention.
Figure 3B:
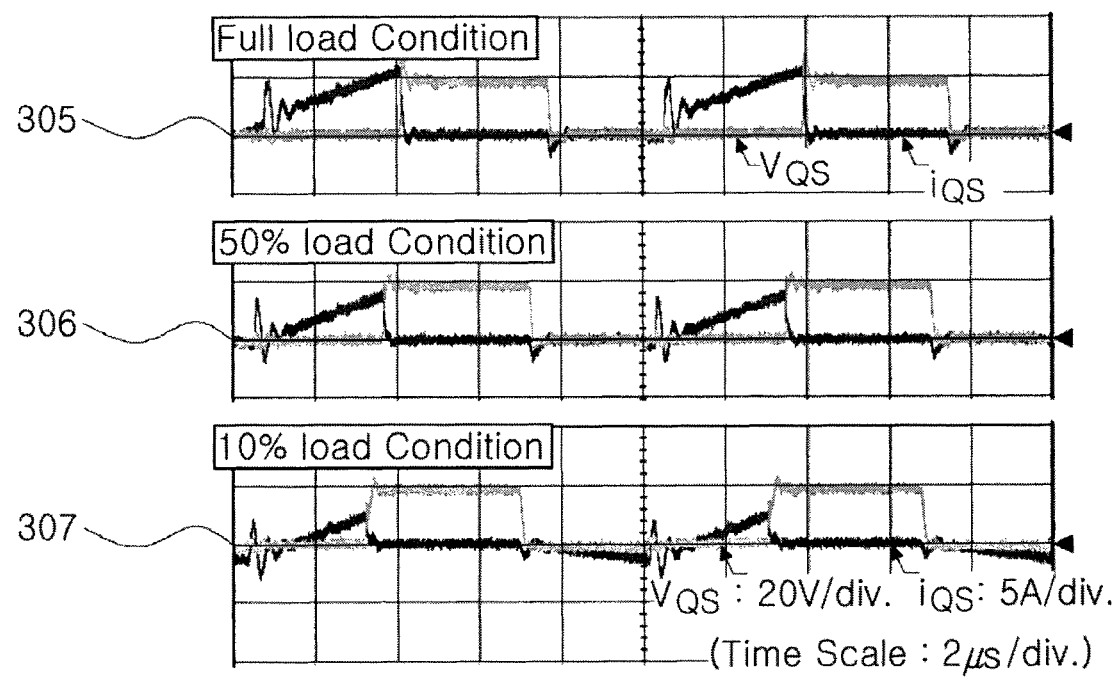

Meanwhile, FIGS. 3A and 3B are respectively, a waveform diagram showing experimental waveforms of a power converter according to an exemplary embodiment of the present invention. FIG. 3A shows waveforms of main components in a full load (100%) and FIG. 3B shows waveforms of the voltage $V_{QS}$ and the current $i_{QS}$ of the auxiliary switching device Qs according to load variation.

Referring to FIG. 3A, a reference numeral 300 indicates the voltage $V_{pri}$ at the primary side winding 101 of the main converter 100, and a reference numeral 301 indicates the current $i_{pri}$ flowing in the primary side winding 101 of the main converter 100. As shown in FIG. 3A, the voltage $V_{pri}$ at the primary side winding 101 of the main converter 100 and the current $i_{pri}$ flowing in the primary side winding 101 of the main converter 100 are properly operated as in simulation waveforms of FIG. 2. In addition, a reference numeral 302 indicates the voltage $V_{rec2}$ at the secondary side winding 102 of the main converter 100, and a reference numeral 303 indicates the voltage $V_{rec1}$ across between the terminals of the diode $D_{O1}$ of the auxiliary converter 110. As shown in FIG. 3A, a frequency of the secondary side voltage $V_{rec1}$ of the auxiliary converter 110 is about two times higher than that of the secondary side voltage $V_{rec2}$ of the main converter 100 and is operated as in the simulation waveforms of FIG. 2.

Meanwhile, referring to FIG. 3B, a reference numeral 305 indicates waveforms of the voltage $V_{QS}$ and the current $i_{QS}$ of the auxiliary switching device Qs in a full load (100% load), a reference numeral 306 indicates waveforms of the voltage $V_{QS}$ and the current $i_{QS}$ of the auxiliary switching device Qs in a load of 50%, and a reference numeral 307 indicates waveforms of the voltage $V_{QS}$ and the current $i_{QS}$ of the auxiliary switching device Qs in a load of 10%. As shown in FIG. 3B, the auxiliary switching device Qs is turned on at the time when the first switching device $Q_1$ or the second switching device $Q_2$ is turned on, whereby the zero voltage switching of the auxiliary switching device Qs may be performed even under a load state in a range of 10% to 100%.

Figure 4:
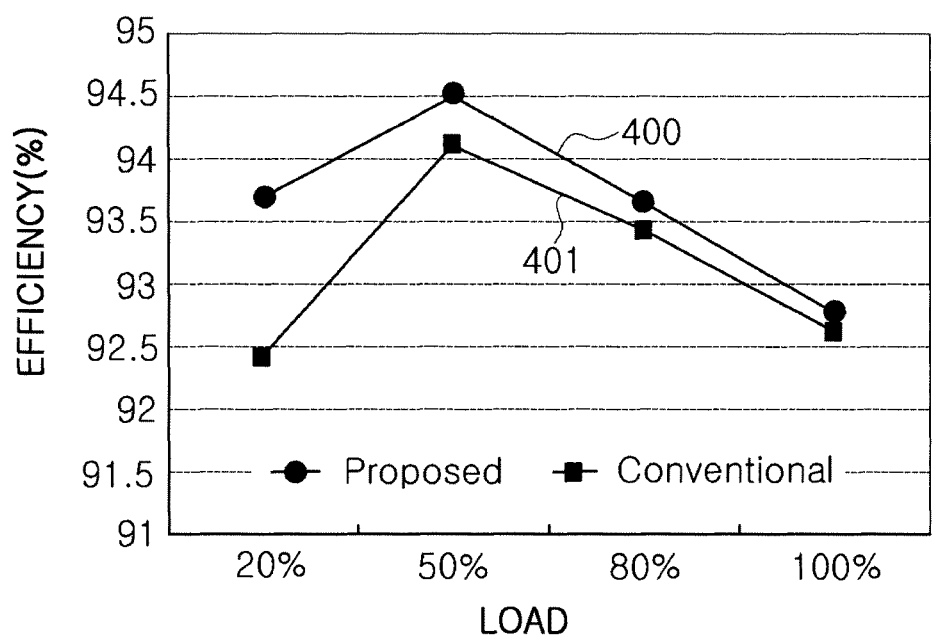
FIG. 4 is a comparative diagram showing efficiencies of a power converter according to the related art and a power converter according to an exemplary embodiment of the present invention.

Meanwhile, FIG. 4 is a comparative diagram showing efficiencies of a power converter according to the related art and a power converter according to an exemplary embodiment of the present invention.

Referring to FIG. 4, the secondary side circuit 112 of the auxiliary converter 110 is integrated in the main converter 100 according to the exemplary embodiments of the present invention, whereby the efficiency may be improved, as compared to a power converter according to the related art (that is, a power converter in which the auxiliary converter is disposed separately from the main converter), even under a load condition in the range of 20% to 100%.

As set forth above, according to the exemplary embodiments of the present invention, the secondary-side circuit of the auxiliary converter used as the separate standby power supply is integrated in the main converter capable of performing zero voltage switching and having high efficiency, such that the standby power is supplied to the load only through the auxiliary converter during the standby mode and the main power and the standby power are supplied together to the load through the main converter including the secondary side circuit of the auxiliary converter during the normal mode, whereby the efficiency of the power converter may be improved.

The exemplary embodiments of the present invention have been described with reference to the accompanying drawings. Although the exemplary embodiments of the present invention have described the phase shift DC/DC full-bridge converter as the main converter and the flyback converter as the auxiliary converter, these are only examples. It should be noted that various types of DC/DC converters other than the phase shift DC/DC full-bridge converter and the flyback converter may be used as the main converter and the auxiliary converter. Herein, specific terms have been used, however these are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A power converter comprising:
   a flyback converter converting an input power of a power supply input terminal into a standby power through a primary side circuit connected to the power supply input terminal and a secondary side circuit magnetically coupled to the primary side circuit to supply the standby power; and
   a main converter converting the input power of the power supply input terminal into a main power to supply the main power, and converting the input power of the power supply input terminal into the standby power through the secondary side circuit of the flyback converter to supply the standby power,
   wherein the secondary side circuit of the flyback converter is integrated in the main converter, and
   wherein the main power and the standby power are respectively supplied through the main converter during a normal mode, and the standby power is supplied using the primary side circuit and the secondary side circuit of the flyback converter during a standby mode.

2. The power converter of claim 1, wherein the main converter includes:
   a bridge circuit in which both terminals of a first switching device and a second switching device connected in series are connected in parallel with the power supply input terminal and both terminals of a third switching device and a fourth switching device connected in series are connected in parallel with the power supply input terminal;
   a transformer having a primary side winding connected between a first node, which is a connection point between the first switching device and the second switching device, and a second node, which is a connection point between the third switching device and the fourth switching device and at least one secondary side winding magnetically coupled to the primary side winding; and
   an LC filter connected to the secondary side winding of the transformer.

3. The power converter of claim 2, further comprising a switching module for turning a current flowing in the secondary side winding of the transformer on/off.

4. The power converter of claim 2, wherein the secondary side circuit of the flyback converter is installed between both terminals of the secondary side winding of the transformer and both terminals of the LC filter.

5. The power converter of claim 4, further comprising an auxiliary switching device for turning a current flowing in the secondary side circuit of the flyback converter on/off.

6. The power converter of claim 5, wherein each of the first to fourth switching devices includes a parasitic capacitor and a body diode connected in parallel with each other.

7. The power converter of claim 6, wherein each of the first to fourth switching device is turned on after a voltage charged in the parasitic capacitor, included in each of the switching devices is completely discharged.

8. The power converter of claim 5, wherein the auxiliary switching device is turned on at the time at which the first switching device or the second switching device is turned on.

* * * * *